United States Patent
Fioravanti (10) Patent No.: US 8,504,940 B1
(45) Date of Patent: Aug. 6, 2013

(54) SMOOTH HARDWARE ACCELERATED SCROLLING

(75) Inventor: Ryan Fioravanti, Kitchener (CA)

(73) Assignee: Google Inc., Mountain View, CA (US)

( * ) Notice: Subject to any disclaimer, the term of this patent is extended or adjusted under 35 U.S.C. 154(b) by 42 days.

(21) Appl. No.: 13/251,853

(22) Filed: Oct. 3, 2011

(51) Int. Cl.
*G06F 3/048* (2006.01)
*G06T 13/00* (2011.01)

(52) U.S. Cl.
USPC ........... 715/784; 715/783; 345/473; 345/474; 345/475

(58) Field of Classification Search
USPC .......................................... 715/784
See application file for complete search history.

(56) References Cited

U.S. PATENT DOCUMENTS

| | | | |
|---|---|---|---|
| 5,661,665 A * | 8/1997 | Glass et al. | 348/423.1 |
| 5,892,498 A * | 4/1999 | Marshall et al. | 345/684 |
| 6,067,643 A * | 5/2000 | Omtzigt | 714/47.1 |
| 7,506,270 B1 * | 3/2009 | Bailey et al. | 715/787 |
| 2002/0013166 A1 * | 1/2002 | Yoshitomi | 463/7 |
| 2002/0142843 A1 * | 10/2002 | Roelofs | 463/42 |
| 2007/0146337 A1 * | 6/2007 | Ording et al. | 345/173 |
| 2008/0086703 A1 | 4/2008 | Flynt et al. | |
| 2009/0075694 A1 | 3/2009 | Kim et al. | |
| 2010/0134425 A1 | 6/2010 | Storrusten | |
| 2010/0283743 A1 | 11/2010 | Coddington | |
| 2010/0299599 A1 | 11/2010 | Shin et al. | |
| 2011/0055752 A1 * | 3/2011 | Rubinstein et al. | 715/784 |
| 2011/0154263 A1 | 6/2011 | Roulliere | |
| 2012/0081377 A1 * | 4/2012 | Sowerby et al. | 345/522 |
| 2012/0105473 A1 * | 5/2012 | Bar-Zeev et al. | 345/633 |

OTHER PUBLICATIONS

Olano et al., Combatting Rendering Latency, University of North Carolina at Chapel Hill—Department of Computer Science, available at http://www.cs.unc.edu/~olano/papers/latency/ (last modified Jul. 2, 2002).*

Kleiner, Mario, Performance & Timing—Howto for Psychtoolbox on OS-X, available at http://web.archive.org/web/20070810005922/http://www.kyb.tuebingen.mpg.de/bu/people/kleinerm/ptbosx/ptbdocu-1.0.5MK4R1.html (archived Aug. 10, 2007).*

* cited by examiner

*Primary Examiner* — Doon Chow
*Assistant Examiner* — Conrad Pack
(74) *Attorney, Agent, or Firm* — Sterne, Kessler, Goldstein and Fox P.L.L.C.

(57) ABSTRACT

Disclosed herein are methods and systems for displaying animated objects smoothly on a mobile device. A scrollable list may be displayed on a touch sensitive display device, and a user may make a gesture on the device to cause the list to appear as an animated scrolling list. The user may then make a halting gesture to cause the list to stop. While the list is animated, a screen distance adjustment value is calculated to determine the time taken for a command to be executed by a graphics processing unit. The list may then stop at a location corresponding to the a current position of the list and taking into account the screen distance adjustment value.

16 Claims, 6 Drawing Sheets

SMOOTH HARDWARE ACCELERATED SCROLLING

BACKGROUND

1. Field

Embodiments relate to hardware accelerated scrolling on mobile devices.

2. Background

Many mobile devices have the ability to display scrollable lists on a display screen of the mobile device. These lists may provide menu options, or may allow users to view a list of electronic mail messages or other types of lists. When scrolling these lists, users may experience jerky, unpredictable, or undesired effects when the user wishes to halt the scrolling of the list.

BRIEF SUMMARY

Embodiments include methods, systems, and computer readable storage media for providing smooth hardware accelerated scrolling of windows without jerkiness or skipping when stopping scrolling. In an embodiment, a scrollable list is displayed on a touch sensitive device at a first position. A scroll gesture is detected on the touch sensitive display device. In response to the scroll gesture, the scrollable list is displayed as an animated scrolling list with a current scroll rate. A halting gesture is detected. While the scrollable list is displayed as an animated scrolling list, a screen distance adjustment value is determined, based on the current scroll rate and the load of the touch sensitive display device. A stopping position is determined in response to the halting gesture, based on a present position of the list and the screen distance adjustment value. The scrollable list is then displayed on the touch sensitive display device at the stopping position, in response to the halting gesture.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Mobile devices, such as smartphones, mobile telephones, and tablet devices, may include touch sensitive display devices. Such mobile devices also often include web browsers for viewing web pages on the Internet.

Figure 1:
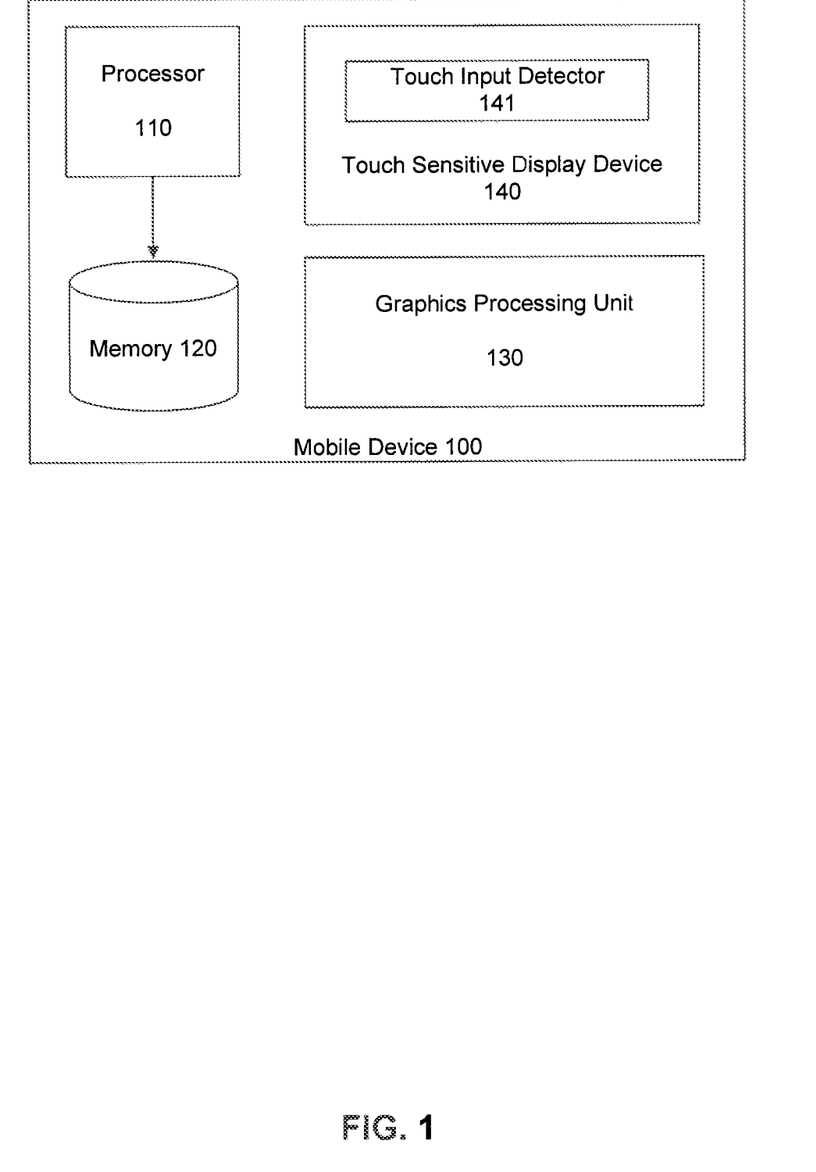
FIG. 1 is a diagram of a mobile device.

FIG. 1 is a diagram of a mobile device 100. Mobile device 100 includes a processor 110, which may be a general purpose or special purpose processor 110. Mobile device 100 also includes memory 120. Processor 110 may be responsible for executing applications, programs, or other software stored on memory 120. For example, processor 110 may execute a web browser application, a mapping application, a gaming application, and a chat application. Processor 110 may execute these applications at the same time, depending on the configuration of mobile device 100.

Mobile device 100 also includes a graphics processing unit 130 and a touch sensitive display device 140. Touch sensitive display device 140 may display a graphical user interface (GUI) to provide an interface between a user of mobile device 100 and an application executing on mobile device 100. Touch sensitive display device 140 may also display content to the user, such as text or images. Graphics processing unit 130 may be responsible for sending and displaying content on touch sensitive display device 140. Graphics processing unit 130 may be responsible for hardware accelerated motion or animation displayed on touch sensitive display device 140. Hardware accelerated motion or animation may be performed by a graphics processing unit to increase performance, as a graphics processing unit may be more suitable for such tasks.

Touch sensitive display device 140 may also include touch input detector 141, which allows the user to manipulate the GUI of mobile device 100 via touch gestures applied to touch sensitive display device 140. For example, the user can press a finger on touch sensitive display device 140 to execute an application or take another action. Touch sensitive display device 140 may then send a signal or other instruction to processor 110 to instruct processor 110 to execute the user's desired application.

Web pages viewed using a web browser may be provided in a manner that allows users to view scrollable windows. For example, web pages may be provided for an electronic mail (e-mail) service. Individual web pages may present a list of the user's current inbox of electronic mail messages. Web pages may also be provided that present a list of electronic documents for viewing or editing by a user. Such a web page may be created, for example, in a combination of Hypertext Markup Language (HTML), Cascading Style Sheets (CSS), and JavaScript. Although examples herein refer to a scrollable list or list, one of skill in the art will recognize that similar techniques can be used on any type of scrollable window, such as a web page browser window. On a mobile device 100 with a touch sensitive display device 140, the user of such a device may make a gesture on the touch sensitive display device 140 to scroll through the list of e-mail messages. Touch input detector 141 may detect such a scroll gesture, and in response, the displayed list may appear animated on touch sensitive display device 140 to scroll through the list of e-mail messages. A graphics processing unit 130 of a mobile device 100 may be instructed to make the list appear as an animated scrolling list.

When the user encounters a particular message or messages that she desires to view in detail, she may make a halting gesture on the touch sensitive display device 140 to stop the list from scrolling. As used herein, a halting gesture is a gesture intended to cause display device 140 to display the list statically. In response, the scrollable list may stop at or near the location that the user desires.

In order to stop the list from scrolling, the touch sensitive display device 140 may, in conjunction with processor 110, determine a stopping location or coordinate of the list in response to the user's halting gesture. Once the stopping location or coordinate is determined, such a coordinate may be sent to the graphics processing unit 130 of the mobile device. The graphics processing unit 130 may then stop the animation at the received coordinate. However, depending on the other programs, applications, and other functions currently running on the mobile device, the coordinate may be received at the graphics processing unit 130 after the animated scrolling list has passed the stopping coordinate.

Thus, once the graphics processing unit 130 receives the stopping coordinate, the graphics processing unit 130 may set the current position of the list to that coordinate. This change may make the scrollable list appear to jump from its current position back to the coordinate corresponding to the location.

Figure 2A:
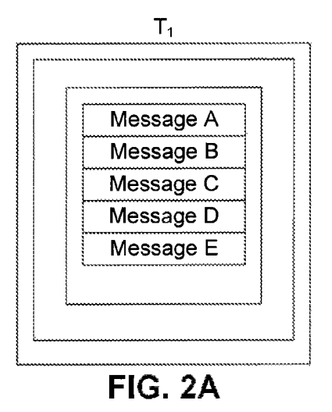
FIGS. 2A-2E show an illustration of an animated scrolling list.

FIGS. 2A through 2E represent a timeline of such a sequence of events. In FIG. 2A, at time T1, a touch sensitive display device 140 of mobile device 100 displays a scrollable list of five messages, Message A through Message E.

Figure 2B:
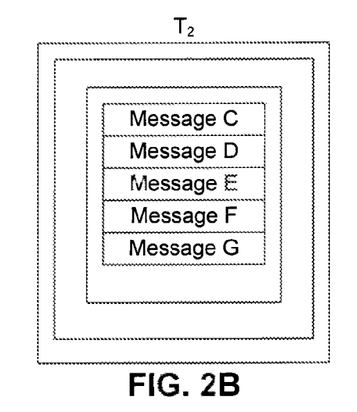

At time T2, the user has made a scrolling gesture on touch sensitive display device 140, which causes the list to appear as an animated scrolling list. As seen in FIG. 2B, Message C has moved to the top of the list of messages, and the current list displays Message C through Message G.

Figure 2C:
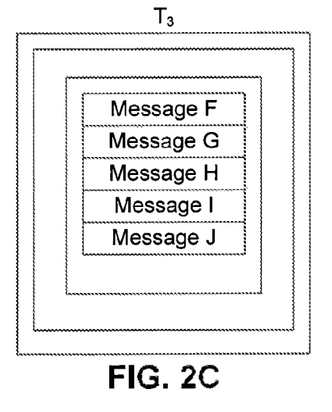

At time T3 of FIG. 2C, the list may continue to appear as an animated scrollable list on touch sensitive display device 140. At time T3, the user may have encountered a desired message on the scrollable list, for example, Message H, and may make a halting gesture on touch sensitive display device 140 to make the scrollable list stop scrolling. At time T3, Message F appears at the top of the list. In response to the user's gesture, touch sensitive display device 140 and processor 110 may determine a stopping coordinate of the list and send the coordinate to graphics processing unit 130. The stopping coordinate may instruct graphics processing unit to display the list where Message F appears as the first item of the list.

Figure 2D:
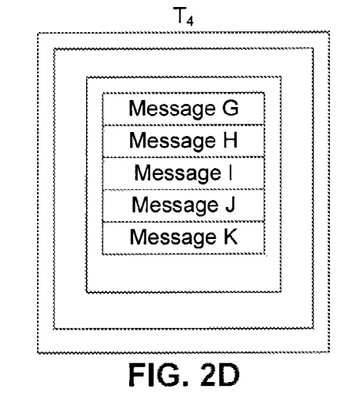

Depending on the applications being executed by processor 110 and the speed of processor 110, graphics processing unit 130 may not receive the stopping coordinate for some time after the user has made the halting gesture. Thus, for example, graphics processing unit 130 may not receive the stopping coordinate until time T4 of FIG. 2D. As seen in FIG. 2D, at time T4, the animated scrolling list has continued to scroll, to where Message G is at the top of the list.

Figure 2E:
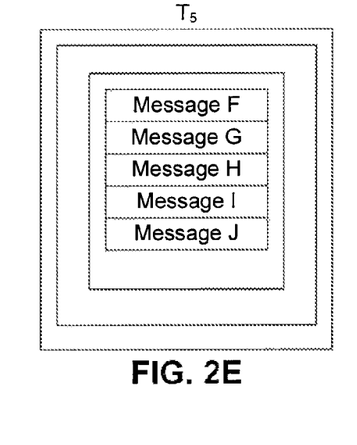

Upon receiving the stopping coordinate, at time T5 graphics processing unit 130 sets the position of the list according to the received stopping coordinate. FIG. 2E displays such a list, where Message F again appears at the top of the scrollable list. Setting the position of the list accordingly may appear jerky to the user and provide a undesired viewing experience.

Coordinates corresponding to a mobile device display may be provided as a pair of (x, y) coordinates, where the x value corresponds to the horizontal position, and the y value corresponds to the vertical position.

As an example of the above situation, a scrollable list may be displayed on a user's mobile device, with the top of the scrollable list starting at position (0, 100). The user may make a scroll gesture and cause the scrollable list to appear as an animated scrolling list. Once the user has located a desired stopping position, she may make a halting gesture on the touch sensitive display when the top of the list is located at position (0, 75). The touch sensitive display device may send this coordinate to the graphics processing unit to instruct it to stop scrolling and display this point.

However, by the time the graphics processing unit receives the (0, 75) coordinate, the top of the scrollable list may be at position (0, 65) or some other position. When the graphics processing unit receives the (0, 75) coordinate, it will adjust the top of the list from the coordinate of (0, 65) to (0, 75), a 10 pixel adjustment. Such an adjustment may appear jerky to the user.

In the example given above, the value between the desired location and the actual location was 10 pixels. However, this value may be dependent on a load of a processor of a mobile device. For example, if the processor of the mobile device is executing multiple applications at once, the value between the desired location and the actual location may be 10 pixels. If the processor of the mobile device is only executing the web browser, the value between the desired location and the actual location may only be 2 pixels or some other value less than 10. If the processor of the mobile device is executing many applications at once, the value between the desired location and the actual location may be greater than 10 pixels.

Figure 3:
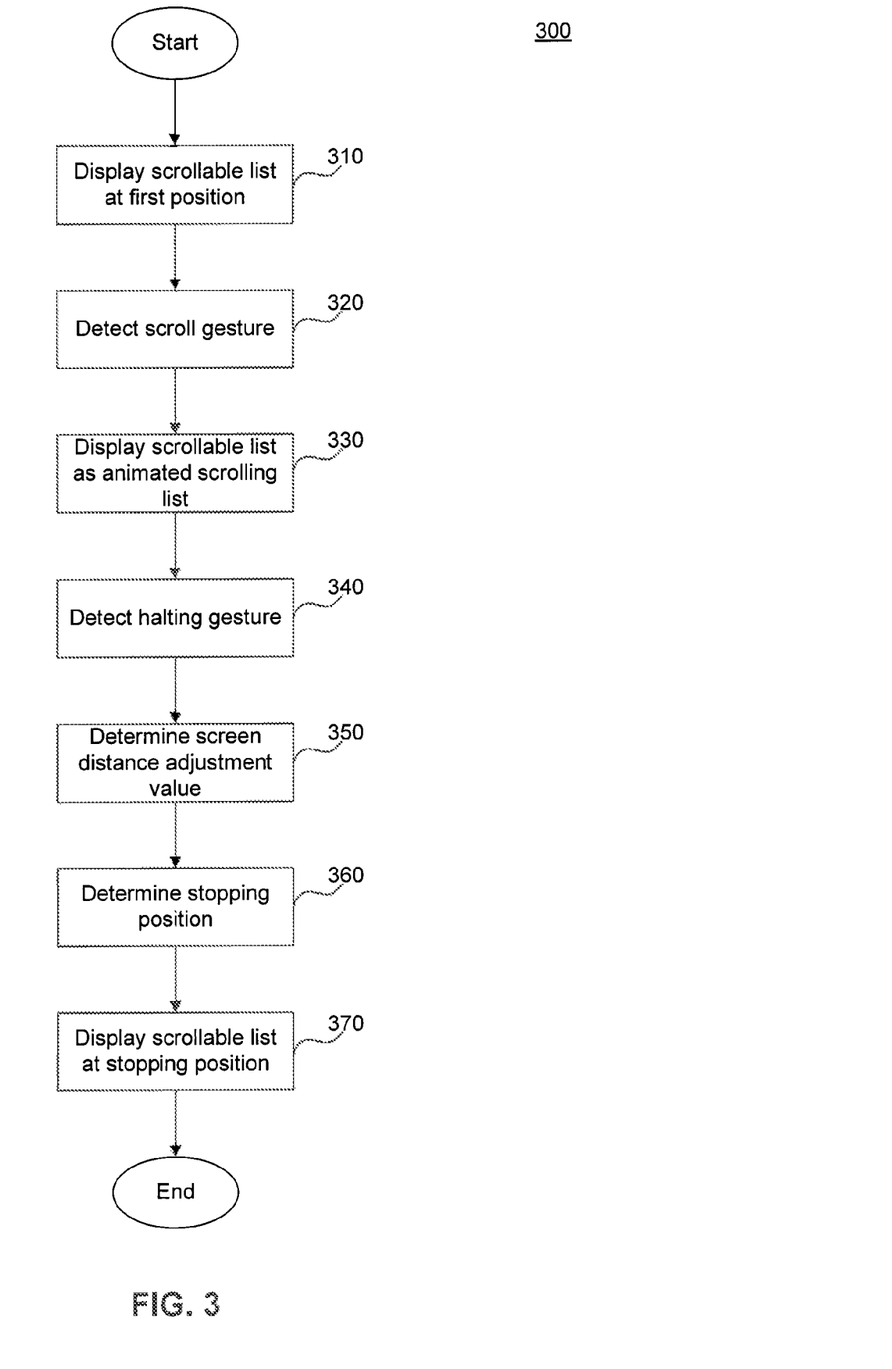
FIG. 3 is a flow diagram of a method for providing smooth scrolling of lists.

According to an embodiment, given the load of the processor, the graphics processing unit is made aware of the pixel difference. As a result, in the example given above, the list may stop at the (0, 65) coordinate and the scrolling may appear smooth to the user. To do this, an appropriate screen distance adjustment value is received by the graphics processor each time the list is scrolled, depending on the load of the mobile device. FIG. 3 is a flow diagram of a method 300 to determine a screen distance adjustment value, which may allow for the user's experience to be consistently smooth, in accordance with an embodiment.

At block 310 of method 300, a scrollable list is displayed at a first position on a display. As described above, the first position may be defined by an (x, y) pair of coordinates. Other coordinate systems may be possible as well. The scrollable list may represent a list of e-mail messages, a checklist of items, a list of products, or any other collection of data that may be represented as a list.

At block 320 of method 300, a scroll gesture is detected. The scroll gesture may be detected by a touch sensitive display device of a mobile device. In an embodiment, the scroll gesture may be one of an upward swipe, a downward swipe, a right-to-left swipe, or a left-to-right swipe.

At block 330, in response to the scroll gesture detected at block 320, the scrollable list is displayed as an animated scrolling list. The direction of the animated scrolling list may be dependent on the particular scroll gesture detected. For example, if the scroll gesture detected was an upward swipe, the list may scroll such that items on the bottom of the list scroll upwards.

At block 340, a halting gesture is detected. Depending on the implementation of the touch sensitive display device and a mobile device, the halting gesture may vary. For example, the halting gesture may simply be a user pressing her finger on the touch sensitive display device.

At block 350, while the scrollable list remains displayed as an animated scrolling list, a screen distance adjustment value is determined. Determining the screen distance adjustment value is further explained below with reference to method 400 of FIG. 4.

At block 360, a stopping position is determined, based on a present position of the scrollable list and the screen distance adjustment value. The stopping position may be determined by adding the present position of the scrollable list and the screen distance adjustment value.

Thus, at block 370, the scrollable list is displayed at the stopping position determined at block 360.

Figure 4:
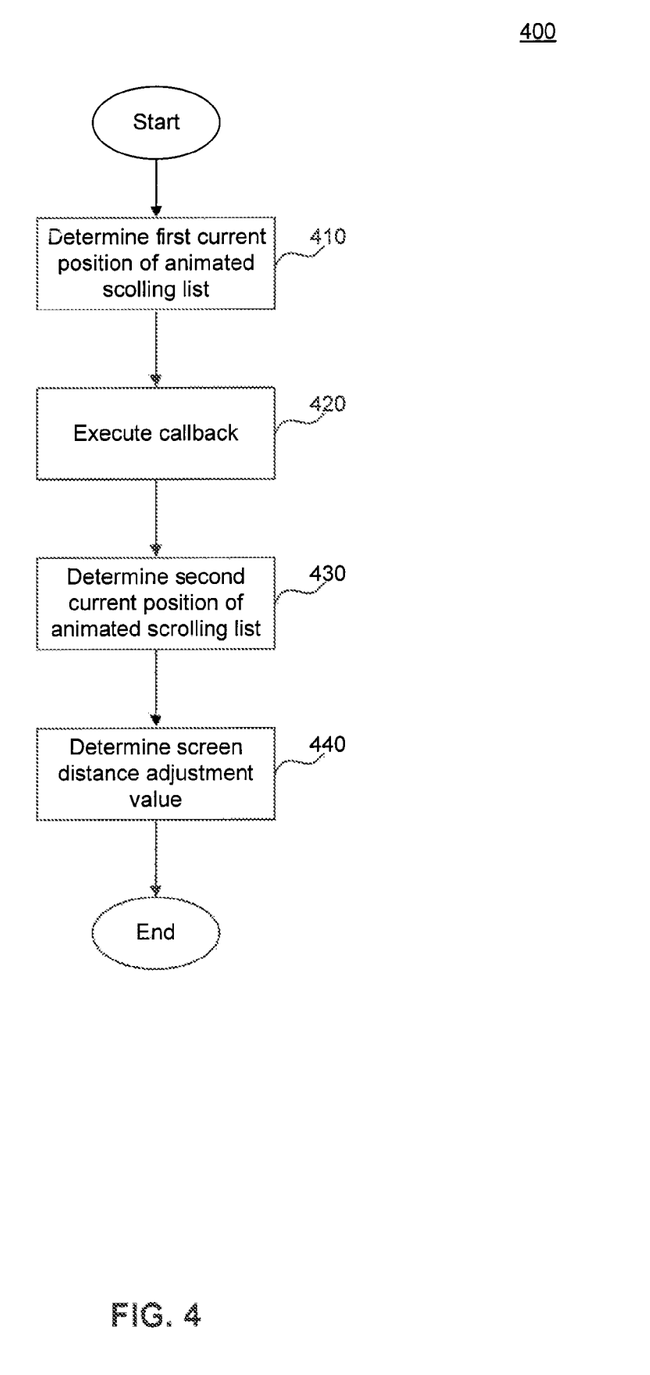
FIG. 4 is a flow diagram of a method of determining a screen distance adjustment value in accordance with embodiments.

As described with reference to block 350 of method 300, a screen distance adjustment value is determined while the scrollable list is displayed as an animated scrolling list. FIG. 4 is a diagram of a method 400 for determining a screen distance adjustment value, in accordance with an embodiment.

At block 410, a first current position of the animated scrolling list is determined. For example, the first current position of the animated scrolling list could correspond to a coordinate of the top of the animated scrolling list or the bottom of the animated scrolling list.

At block 420, a callback function is executed. A callback function instructs a processor, such as a graphics processing unit, to execute a unit of work. The callback function may assist in providing an estimate as to how long a command takes to be executed by the graphics processing unit.

At block 430, a second current position of the animated scrolling list is determined, wherein the second current position is determined at a later time than the first current position. For example, the second current position of the animated scrolling list may correspond to a coordinate of the top of the animated scrolling list or the bottom of the animated scrolling list. The second current position of the animated scrolling list determined at block 430 may also be the present position of the scrollable list as described with reference to block 360 of method 300.

At block 440, the screen distance adjustment value is determined. The screen distance adjustment value may be determined by subtracting the first current position from the second current position. Thus, the screen distance adjustment value may represent an estimate of how many pixels the animated scrolling list travels during the time taken to send a command to a graphics processing unit to be executed.

Once this value is known, it can be incorporated into the stopping position calculation to display the list at the stopping position after a halting gesture is detected. Thus, in combination, method 300 and method 400 provides for a smooth scrolling user experience without undesired jerkiness. An example of an execution of method 300 and method 400 together follows.

A scrollable list that represents a list of e-mail messages is displayed on a mobile device. The top of the scrollable list may be displayed at position (0, 100), in accordance with block 310 of method 300. A user may make an upward swipe gesture to scroll the list, which is detected in accordance with block 320. Thus, the scrollable list is displayed as an animated scrolling list in accordance with block 330.

In accordance with block 340, a halting gesture is then detected. In accordance with block 350, a screen distance adjustment value is determined while the list is displayed as an animated scrolling list as described with reference to method 400. In accordance with block 410, a first current position of the animated scrolling list is determined. The first current position of the animated scrolling list may be determined to be (0, 75).

In accordance with block 420, a callback function is then executed. After the execution of the callback function, in accordance with block 430, the second current position of the animated scrolling list is determined. At this point, the second current position of the animated scrolling list may be determined to be (0, 65), in accordance with block 430.

In accordance with block 440, the screen distance adjustment value may be determined to be −10 pixels, by subtracting 75 from 65. Returning to method 300, at block 360, a stopping position is determined, based on the present position of the scrollable list and the screen distance adjustment value. As described above, the present position of the scrollable list may be the second current position determined in accordance with block 430. In this example, the present position may be determined to be (0, 65).

Thus, as noted above, in this example the animated scrolling list travels 10 pixels (the screen distance adjustment value) in the time it takes to send an instruction to the graphics processing unit. In accordance with block 360, the stopping position is determined by adding the screen distance adjustment value to the present position. The stopping position is determined to be (0, 55). Thus, in accordance with block 370, the scrollable list is displayed at position (0, 55). The overall scrolling animation may appear smooth to the user.

In an embodiment, the screen distance adjustment value may depend on the current scroll rate of the animated scrolling list. For example, the user may cause a scrollable list to appear as an animated scrolling list at a first rate, as a result of a scroll gesture. The first rate may be dependent on a detected velocity at which the user performed the scroll gesture. A screen distance adjustment value may then be determined while the list is animated at the first rate. As an example, the screen distance adjustment value may be five pixels.

At a later time, the user may cause the scrollable list to again appear as an animated scrolling list at a second rate, as a result of a subsequent scroll gesture. The subsequent scroll gesture may cause the second rate to be faster than the first rate. For example, the second rate may be dependent on a faster detected velocity of the subsequent scroll gesture. In accordance with an embodiment, a screen distance adjustment value may be determined while the list is animated at the second rate. If the second scroll rate is faster than the first scroll rate, the screen distance adjustment value may be greater than five pixels, as the animated scrolling list may travel farther during the same time, due to the faster second rate.

In an embodiment, the scroll rate of the animated scrolling list may vary while the list is animated. For example, the animated scrolling list may appear to slow down after an initial period of appearing to scroll at a rate corresponding to the velocity of the user's scroll gesture.

Figure 5:
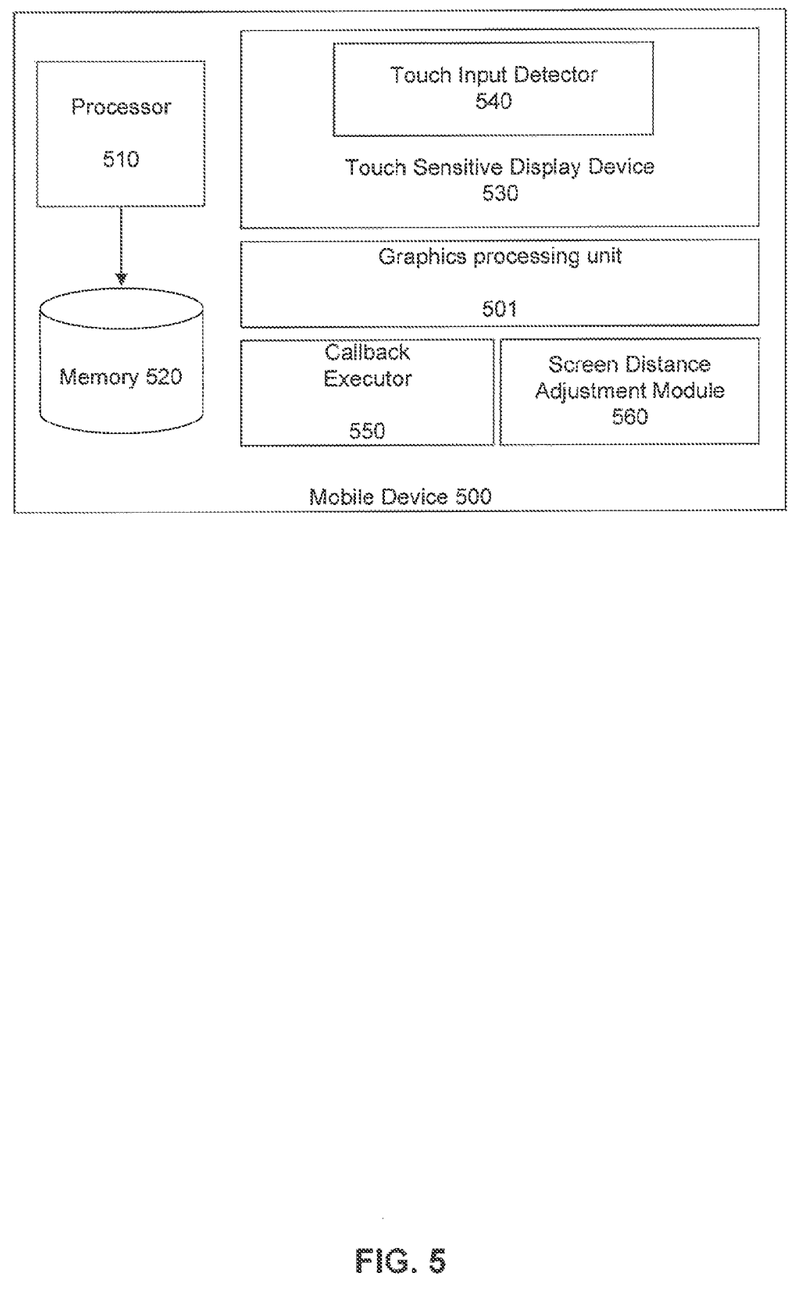
FIG. 5 is a diagram of a mobile device in accordance with embodiments.

FIG. 5 is a diagram of a mobile device 500 that allows smooth hardware accelerated scrolling, in accordance with an embodiment. Mobile device 500 may be, for example and without limitation, a mobile telephone, such as a smart phone, or a tablet device.

Mobile device 500 includes processor 510. Processor 510 may be a general purpose or special purpose processor. Mobile device 500 also includes memory 520. Memory 520 may be any type of persistent memory, such as flash storage, RAM, ROM, or a hard disk drive. Processor 510 may execute instructions stored on memory 520.

Mobile device 500 further includes touch sensitive display device 530 and touch input detector 540. Touch sensitive display device 530 and touch input detector 540 may operate in conjunction to detect a scroll gesture from a user, such as an upward or downward swipe gesture. Touch sensitive display device 530 and touch input detector 540 may further operate in conjunction to detect a halting gesture from a user.

Mobile device 500 further includes graphics processing unit 501. Graphics processing unit 501 may be configured to display a scrollable list on touch sensitive display device 530. Graphics processing unit 501 may further be configured to display a scrollable list as an animated scrolling list, in accordance with embodiments.

Mobile device 500 further includes instructions for callback executor 550. Callback executor 550 may be configured to execute a callback function on a graphics processing unit 501 when an instruction is received to execute such a function.

Mobile device 500 further includes screen distance adjustment module 560. Screen distance adjustment module 560 may be configured to determine a screen distance adjustment value in accordance with method 300 and method 400, as described herein.

FIGS. 6A through 6D represent a timeline of providing smooth hardware accelerated scrolling, in accordance with embodiments. FIGS. 6A through 6D represent an exemplary execution of method 300 and method 400 by a mobile device 500.

Figure 6A:
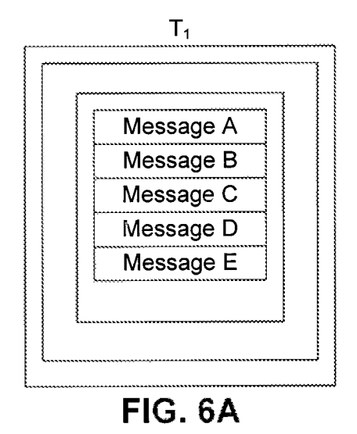
FIGS. 6A-6D show an illustration of smooth animated scrolling in accordance with embodiments.

In FIG. 6A, at time T1, touch sensitive display device 530 of mobile device 500 displays a scrollable list of five messages, Message A through Message E, in accordance with block 310 of method 300.

Figure 6B:
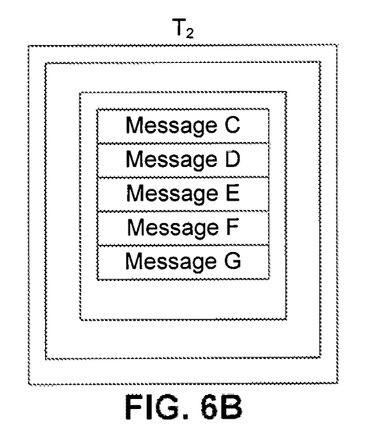

At time T2, the user has made a scrolling gesture on touch sensitive display device 530. Such a gesture may be detected in accordance with block 320 of method 300. Upon detection of the scrolling gesture, graphics processing unit 501 causes the list to appear as an animated scrolling list, in accordance with block 330 of method 300. As seen in FIG. 6B, Message C has moved to the top of the list of messages, and the current list may display Message C through Message G.

Figure 6C:
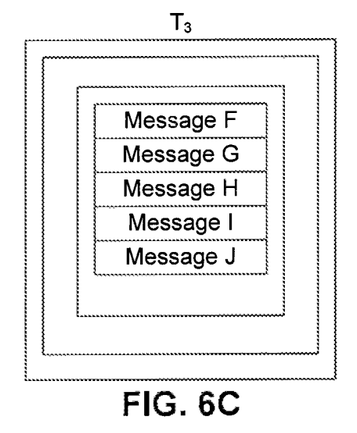

At time T3 of FIG. 6C, the list continues to appear as an animated scrollable list on touch sensitive display device 530. At time T3, the user encounters a desired message on the scrollable list, for example, Message H, and makes a halting gesture on touch sensitive display device 530 to make the scrollable list stop scrolling. Touch sensitive display device 530 may detect the halting gesture in accordance with block 340.

While the list is displayed as an animated scrolling list and in response to the halting gesture, screen distance adjustment module 560 of mobile device 500 may determine a screen distance adjustment value in accordance with block 350 of method 300 and method 400. That is, after time T3, screen distance adjustment module 560 may, in conjunction with callback executor 550, determine that the animated scrolling list moves a certain distance in the time it takes for a command to be received at the graphics processing unit.

At time T3, Message F appears at the top of the list. Touch sensitive display device 530 and processor 510 may determine a stopping coordinate of the list. Further, processor 510 may determine the stopping position of the list in accordance with block 360 by adding the screen distance adjustment value to the present position of the scrollable list. Processor 510 may then send the stopping position to graphics processing unit 501. In this example, the stopping position may represent that the list should be displayed where Message G is the first message.

Figure 6D:
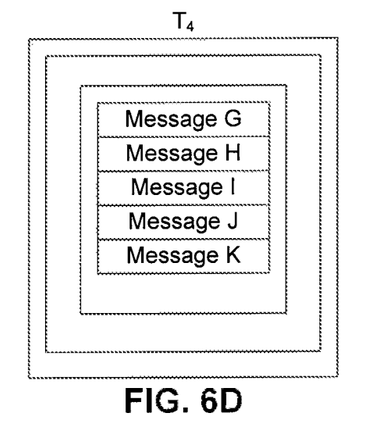

Thus, at time T4 of FIG. 6D, graphics processing unit 501 receives the second position and sets the position of the list according to the received stopping position. FIG. 6D displays such a list, where Message G appears at the top of the scrollable list. Setting the position of the list in this manner, in accordance with an embodiment, may appear smooth to the user and lead to an improved user experience.

In accordance with an embodiment, the screen distance adjustment value may be determined by the time necessary for an instruction to be sent to a graphics processing unit. While the scrollable list is displayed as an animated scrolling list, a first current time may be determined. A callback function may then be executed. Once the callback function has executed, a second current time may be determined while the scrollable list is displayed as an animated scrolling list. A screen distance adjustment value may be determined, based on a difference between the second current time and the first current time, and a previously established correlation between time and screen distance. For example, it may be known that an animated list travels 5 pixels for each 10 ms. Thus, if the difference between the first current time and the second current time is 5 ms, the screen distance adjustment value may be determined to be 2.5 pixels.

In accordance with an embodiment, a screen distance adjustment value may be determined to provide for smooth hardware accelerated movement of other objects. For example, a user may be playing a game on a mobile device. The game may feature a movable character that can appear stationary on the touch sensitive display device or may move based on touch input by the user. In accordance with an embodiment, while the movable character is animated and moving, a screen distance adjustment value may be determined. If the user makes a halting gesture on the touch sensitive display device, the movable character may stop according to a position determined by the character's position when the halting gesture is detected and the screen distance adjustment value. Further, a screen distance adjustment value may be determined to provide for smooth hardware accelerated scrolling of other objects, such as a photograph, a series of objects displayed on a touch sensitive display device, an article on a web page, or other objects that may be scrolled.

Some embodiments may be directed to computer products comprising software stored on any computer readable medium. Such software, when executed in one or more data processing device, causes a data processing device(s) to operate as described herein.

Certain embodiments may be implemented in hardware, software, firmware, or a combination thereof. Some embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for displaying a list, comprising:
    displaying a scrollable list on a touch sensitive display device at a first position;
    detecting a scroll gesture on the touch sensitive display device;
    displaying the scrollable list as an animated scrolling list having a current scroll rate on the touch sensitive display device, in response to the detection of the scroll gesture;
    detecting a halting gesture on the touch sensitive display device;
    in response to the halting gesture:
        determining a screen distance adjustment value based on at least a current load of the touch sensitive display device, wherein determining a screen distance adjustment value comprises:
            determining a first current position of the animated scrolling list while the scrollable list is displayed as an animated scrollable list,
            executing a callback function,
            determining a second current position of the animated scrolling list after the execution of the callback function while the scrollable list is displayed as an animated scrollable list, and
            determining the screen distance adjustment value by subtracting the first current position from the second current position;
        determining a present position of the scrollable list;
        calculating a stopping position based on the present position and the screen distance adjustment value, wherein the stopping position is calculated by the screen distance adjustment value added to the present position; and
        displaying the scrollable list at the stopping position on the touch sensitive display device.

2. The method of claim 1, wherein displaying the scrollable list as an animated scrolling list having a current scroll rate on the touch sensitive display device, in response to the scroll gesture is performed by a graphics processing unit.

3. The method of claim 1, wherein determining a screen distance adjustment value further comprises:
    determining a first current time while the scrollable list is displayed as an animated scrolling list;
    executing a callback function;
    determining a second current time after execution of the callback function while the scrollable list is displayed as an animated scrolling list; and
    determining the screen distance adjustment value based on a difference between the second current time and the first current time and a correlation between time and screen distance.

4. The method of claim 1, wherein the scroll gesture is one of an upward swipe, a downward swipe, a right-to-left swipe, and a left-to-right swipe.

5. The method of claim 1, wherein the scrollable list further comprises a scrollable list of electronic mail messages.

6. The method of claim 1, wherein the scrollable list further comprises a scrollable list of electronic documents.

7. A system for displaying a list, comprising:
    a touch sensitive display device;
    one or more processors; and
    a memory in communication with the one or more processors, the memory containing instructions that, if executed by the one or more processors, cause the system to:
        display a scrollable list on the touch sensitive display device,
        detect a scroll gesture on the touch sensitive display device,
        display the scrollable list as an animated scrolling list having a current scroll rate on the touch sensitive display device, in response to the scroll gesture,
        detect a halting gesture on the touch sensitive display device,
        in response to the halting gesture:
            determine a screen distance adjustment value based on at least a current load of the one or more processors, wherein determining a screen distance adjustment value comprises:
                determining a first current position of the animated scrolling list while the scrollable list is displayed as an animated scrollable list, executing a callback function,
                determining a second current position of the animated scrolling list after the execution of the callback function while the scrollable list is displayed as an animated scrollable list, and
                determining the screen distance adjustment value by subtracting the first current position from the second current position;
            determine a present position of the scrollable window,
            determine a stopping position based on the present position and the screen distance adjustment value, and
            display the scrollable window at the stopping position on the touch sensitive display device.

8. The system of claim 7, the memory containing further instructions that, when executed by the one or more processors, cause the one or more processors to:
    determine a screen distance adjustment value, based on at least a current load of the processor by:
        determining a first current time while the scrollable list is displayed as an animated scrolling window,
        executing a callback function,
        determining a second current time after execution of the callback function while the scrollable list is displayed as an animated scrolling list, and
        determining the screen distance adjustment value based on a difference between the second current time and the first current time and a correlation between time and screen distance.

9. The system of claim 7, wherein the scroll gesture is one of an upward swipe, a downward swipe, a right-to-left swipe, and a left-to-right swipe.

10. The system of claim 7, wherein the scrollable list further comprises a scrollable list of electronic mail messages.

11. The system of claim 7, wherein the scrollable list further comprises a scrollable list of electronic documents.

12. The system of claim 7, further comprising a graphics processing unit.

13. A non-transitory computer readable storage medium having instructions stored thereon that, when executed by a processor, cause the processor to perform operations including:

displaying a scrollable list on a touch sensitive display device at a first position;

detecting a scroll gesture on the touch sensitive display device;

displaying the scrollable list as an animated scrolling list having a current scroll rate on the touch sensitive display device, in response to the scroll gesture;

detecting a halting gesture on the touch sensitive display device;

in response to the halting gesture:

determining a screen distance adjustment value based on at least a current load of the touch sensitive display device, wherein determining a screen distance adjustment value comprises:

determining a first current position of the animated scrolling list while the scrollable list is displayed as an animated scrollable list,             executing a callback function,             determining a second current position of the animated scrolling list after the execution of the callback function while the scrollable list is displayed as an animated scrollable list, and             determining the screen distance adjustment value by subtracting the first current position from the second current position;

determining a present position of the scrollable list;

determining a stopping position based on the present position and the screen distance adjustment value; and         displaying the scrollable list at the stopping position on the touch sensitive display device.

14. The non-transitory computer readable storage medium of claim 13, wherein the operation of displaying the scrollable list as an animated scrolling list having a current scroll rate on the touch sensitive display device, in response to the scroll gesture is performed by a graphics processing unit.

15. The non-transitory computer readable storage medium of claim 13, wherein determining a screen distance adjustment value further comprises:

determining a first current time while the scrollable list is displayed as an animated scrolling list;

executing a callback function;

determining a second current time after execution of the callback function while the scrollable list is displayed as an animated scrolling list; and     determining the screen distance adjustment value based on a difference between the second current time and the first current time and a correlation between time and screen distance.

16. The non-transitory computer readable storage medium of claim 13, wherein the scroll gesture is one of an upward swipe, a downward swipe, a right-to-left swipe, and a left-to-right swipe.

\* \* \* \* \*

UNITED STATES PATENT AND TRADEMARK OFFICE
CERTIFICATE OF CORRECTION

| | | |
|---|---|---|
| PATENT NO. | : 8,504,940 B1 | Page 1 of 1 |
| APPLICATION NO. | : 13/251853 | |
| DATED | : August 6, 2013 | |
| INVENTOR(S) | : Ryan Fioravanti | |

It is certified that error appears in the above-identified patent and that said Letters Patent is hereby corrected as shown below:

Title page
Item (57) Abstract, line 10, please replace "to the a current position" with --to the current position--.

Signed and Sealed this
Thirtieth Day of September, 2014

Michelle K. Lee
*Deputy Director of the United States Patent and Trademark Office*